United States Patent
Hirai (10) Patent No.: US 8,163,407 B2
(45) Date of Patent: Apr. 24, 2012

(54) METHOD FOR CONTROLLING SODIUM-SULFUR BATTERY

(75) Inventor: Naoki Hirai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/071,884

(22) Filed: Mar. 25, 2011

(65) Prior Publication Data

US 2011/0206955 A1    Aug. 25, 2011

Related U.S. Application Data

(60) Provisional application No. 61/101,162, filed on Sep. 30, 2008.

(51) Int. Cl.
*H01M 10/42* (2006.01)

(52) U.S. Cl. ........................... 429/50; 429/61

(58) Field of Classification Search ............... 429/50
See application file for complete search history.

(56) References Cited

U.S. PATENT DOCUMENTS

| | | | |
|---|---|---|---|
| 2001/0043013 A1 | 11/2001 | Abe | |
| 2008/0076010 A1* | 3/2008 | Sato | ............... 429/61 |

FOREIGN PATENT DOCUMENTS

| | | |
|---|---|---|
| JP | 06-251804 | 9/1994 |
| JP | 2000-073932 | 3/2000 |
| JP | 2000-078895 | 3/2000 |
| JP | 2001-298872 | 10/2001 |
| JP | 2001-327083 | 11/2001 |
| JP | 2003-317808 | 11/2003 |
| JP | 2008-84677 | 4/2008 |

* cited by examiner

*Primary Examiner* — Patrick Joseph Ryan
*Assistant Examiner* — Brent Thomas
(74) *Attorney, Agent, or Firm* — Burr and Brown (57) ABSTRACT

In a method for controlling a sodium-sulfur battery, a time of correcting or resetting a depth of discharge of the sodium-sulfur battery is determined within a predetermined period based on weather information, and the depth of discharge of the sodium-sulfur battery is corrected or reset in the determined time. According to this sodium-sulfur battery control method, the depth of discharge of the sodium-sulfur battery can be accurately managed in a small-scale interconnected system.

10 Claims, 3 Drawing Sheets

METHOD FOR CONTROLLING SODIUM-SULFUR BATTERY

TECHNICAL FIELD

The present invention relates to a method for controlling a sodium-sulfur battery, which is preferably used in a small-scale interconnected system. The small-scale interconnected system is a system in which a power generation device that fluctuates in output, such as a wind power generation device, and an electric power storage-compensation device that includes a sodium-sulfur battery of a small rated capacity are combined to supply power to an electric power system.

BACKGROUND ART

In recent years, a renewable energy power generation device for generating electric power from wind power, solar photovoltaic energy, geothermal energy, or the like has attracted attention and been put to practical use. The renewable energy power generation device is a clean power generation device that does not use any limited resource such as oil but uses an energy resource present in unlimited quantity in nature, and can suppress carbon dioxide emissions. Hence, the renewable energy power generation device has been increasingly introduced by companies, governments, and the like worldwide, for prevention of global warming.

However, since energy coming from nature varies from moment to moment, output fluctuations are unavoidable in the renewable energy power generation device. This poses an obstacle to widespread use of the renewable energy power generation device.

To remove this obstacle and achieve constant output, in the case of employing the renewable energy power generation device, an interconnected (power generation) system that combines the renewable energy power generation device with an electric power storage-compensation device including a secondary battery as a main component is built.

As one type of the secondary battery, a sodium-sulfur battery has features such as a high energy density, an ability to produce high output in a short time, and an excellent high-speed response. Accordingly, by adding a bidirectional converter for controlling charge and discharge, it is possible to compensate for output fluctuations of the renewable energy power generation device which can occur on the order of several hundred milliseconds to several seconds. Therefore, the interconnected system in which the renewable energy power generation device is combined with the electric power storage-compensation device that includes the sodium-sulfur battery as a component is a desirable power generation system.

Though there seems to be no prior art that has the same object as the present application, relevant techniques are disclosed, for example, in. Patent Document 1 (JP-A-2003-317808) and Patent Document 2 (JP-A-2008-084677).

SUMMARY OF THE INVENTION

Conventionally, in the electric power storage-compensation device that includes the sodium-sulfur battery as a component, for example a depth of discharge of the sodium-sulfur battery is calculated and managed by performing, from an initially set depth of discharge, addition/subtraction of a current value required for charge/discharge (e.g., addition in the case of charge, and subtraction in the case of discharge) and integration in a control device such as a sequencer.

However, there is a slight error between a current value in control of charge and discharge by the bidirectional converter and an actual current value. Even when analog-digital conversion of the current value is performed, the error occurs slightly. When the current value is integrated by the sequencer for a long time, the error is integrated, too. This being so, if the interconnected system is operated over a long period of time, a discrepancy inevitably occurs between an actual depth of discharge and a management value managed by the control device, in the sodium-sulfur battery included in the electric power storage-compensation device.

Therefore, to accurately manage the depth of discharge (or a stored energy) of the sodium-sulfur battery included in the electric power storage-compensation device in the interconnected system, the management value of the depth of discharge needs to be corrected or reset.

In the case where the sodium-sulfur battery is used as the main component of the electric power storage-compensation device in a load leveling system, the above-mentioned discrepancy is not problematic. In the load leveling system, for example, a discharge end occurs in the evening after the daytime, or a charge end occurs at sunrise after the nighttime. The management value of the depth of discharge of the sodium-sulfur battery can be corrected or reset at such a time, as a result of which the above-mentioned discrepancy can be resolved.

In the electric power storage-compensation device combined with the renewable energy power generation device, on the other hand, it is typically not preferable that the sodium-sulfur battery reaches the discharge end or the charge end, and so the management value of the depth of discharge cannot be easily corrected or reset. This is because the sodium-sulfur battery that has reached the discharge end is subsequently unable to be used for compensation of power fluctuations in a discharge direction until it is charged to a certain level, and equally the sodium-sulfur battery that has reached the charge end is subsequently unable to be used for compensation of power fluctuations in a charge direction until it is discharged to a certain level.

Since the renewable energy power generation device fluctuates in generated power, input or output of power is frequently repeated in the electric power storage-compensation device, and accordingly the sodium-sulfur battery included in the electric power storage-compensation device continuously repeats charge or discharge. This being so, in the sodium-sulfur battery in the interconnected system with the renewable energy power generation device, the above-mentioned discrepancy tends to be larger than in the sodium-sulfur battery used in the load leveling system. This makes it more difficult to accurately manage the depth of discharge.

The discrepancy between the actual depth of discharge and the management value in the sodium-sulfur battery is undesirable because the following problem can occur. The sodium-sulfur battery suddenly reaches the charge end and becomes unable to continue charge or suddenly reaches the discharge end and becomes unable to continue discharge, and stops in the middle of compensating output fluctuations of the renewable energy power generation device.

The present invention has been made in view of such circumstances, and has an object of providing a means for, in an interconnected system combining a renewable energy power generation device that fluctuates in output and an electric power storage-compensation device that includes a sodium-sulfur battery as a component, accurately managing a depth of discharge of the sodium-sulfur battery.

Note that Patent Document 2 proposes a means for accurately managing a depth of discharge of a sodium-sulfur battery in a large-scale interconnected system. The large-scale interconnected system is a system in which a power generation device that fluctuates in output and an electric power storage-compensation device that includes a plurality of (large-capacity) sodium-sulfur batteries are combined to supply power to an electric power system.

However, in the small-scale interconnected system for supplying power to, for instance, an electric power system in an isolated island or a limited specific area, it is not preferable in terms of cost to provide sodium-sulfur batteries in a plurality of control units.

In view of this, the present invention also has an object of providing a sodium-sulfur battery depth of discharge management means that can be effectively used even in the small-scale interconnected system in which an electric power storage-compensation device including a sodium-sulfur battery of a small rated capacity is combined.

As a result of repeated studies, it has been found that the problem stated above can be solved by determining, based on weather information, a time of correcting or resetting the depth of discharge of the sodium-sulfur battery included in the electric power storage-compensation device within a predetermined period, and correcting or resetting the depth of discharge of the sodium-sulfur battery in the determined time. In detail, the following means is provided according to the present invention.

That is, according to the present invention, it is provided a method for controlling a sodium-sulfur battery that, in an interconnected system in which a power generation device that fluctuates in output and an electric power storage-compensation device are combined to supply power to an electric power system, is included in the electric power storage-compensation device and compensates for output fluctuations of the power generation device, the method including determining, based on weather information, a time of correcting or resetting a depth of discharge of the sodium-sulfur battery within a predetermined period, and correcting or resetting the depth of discharge of the sodium-sulfur battery in the determined time.

The sodium-sulfur battery control method according to the present invention is particularly preferable in the case where the interconnected system is small-scale. There is a situation where both the electric power storage-compensation device (sodium-sulfur battery) and the electric power system as a supply destination are small-scale. For example, the small-scale sodium-sulfur battery is a sodium-sulfur battery having a rated output of not more than 2 MW, not more than 1 MW, or even not more than 800 kW. Typically, the electric power system denotes a complex of power facilities. Though this term gives an impression of a large-scale electric power system, the electric power system in this specification denotes any means for supplying energy, including a small-scale electric power system in which a power generation device is composed of only a diesel engine as in an isolated island and the like.

The weather information is weather information of an area in which the interconnected system is installed. The weather information is information about a wind speed, a wind direction, and the like when the power generation device that fluctuates in output is a wind power generation device, and information about whether clear or cloudy (weather change), a sunshine duration, and the like when the power generation device is a photovoltaic power generation device. In the sodium-sulfur battery control method according to the present invention, it is also preferable to determine the time of correcting or resetting the depth of discharge of the sodium-sulfur battery within the predetermined period based on seasonal information in addition to the weather information. This is because, for example, solar photovoltaic energy can vary with season.

In this specification, a system unit of sodium-sulfur battery is not determined by the number of cells, blocks, modules, and the like or an output magnitude. A sodium-sulfur battery controlled by one control system constitutes one sodium-sulfur battery system. In the case where a sodium-sulfur battery composes the electric power storage-compensation device, a sodium-sulfur battery under control of one bidirectional converter is treated as one sodium-sulfur battery system.

In the sodium-sulfur battery control method according to the present invention, it is preferable that the predetermined period is within one month.

More preferably, the predetermined period is two weeks. Even more preferably, the predetermined period is one week.

In the sodium-sulfur battery control method according to the present invention, it is preferable that, toward the time of correcting or resetting the depth of discharge of the sodium-sulfur battery, an output target value of the interconnected system is set to be higher than an output target value set for power compensation or a charge/discharge (output) target value of the sodium-sulfur battery is set to be higher than a charge/discharge target value set for power compensation to thereby lead the sodium-sulfur battery to a discharge end, and a management value of the depth of discharge is corrected or reset when the discharge end is detected.

Alternatively, it is preferable that, toward the time of correcting or resetting the depth of discharge of the sodium-sulfur battery, an output target value of the interconnected system is set to be lower than an output target value set for power compensation or a charge/discharge (output) target value of the sodium-sulfur battery is set to be lower than a charge/discharge target value set for power compensation to thereby lead the sodium-sulfur battery to a charge end, and a management value of the depth of discharge is corrected or reset when the charge end is detected.

In the sodium-sulfur battery control method according to the present invention, the output target value that is set for power compensation is a value of charge power or discharge power that enables output fluctuations of the (renewable energy) power generation device to be continuously compensated so as to achieve a constant output of the interconnected system. The detection of the discharge end or the charge end can be made by a known means based on a battery voltage.

In this specification, a higher charge/discharge target value of the sodium-sulfur battery means shifting to a discharge side, and a lower charge/discharge target value means shifting to a charge side. A difference between the output target value of the interconnected system and an output value of the power generation device that fluctuates in output is the discharge target value or the charge target value of the sodium-sulfur battery. Hence, setting a higher output target value of the interconnected system than a normal output target value and setting a higher charge/discharge target value of the sodium-sulfur battery than a normal charge/discharge target value are synonymous in the present invention. Likewise, setting a lower output target value of the interconnected system than the normal output target value and setting a lower charge/discharge target value of the sodium-sulfur battery than the normal charge/discharge target value are synonymous in the present invention.

The sodium-sulfur battery control method according to the present invention is preferably used when the power generation device that fluctuates in output is a renewable energy power generation device that uses renewable energy of at least one of wind power, solar photovoltaic energy, and geothermal energy.

For instance, in the case where the power generation device that fluctuates in output is a wind power generation device, the sodium-sulfur battery control method according to the present invention is a method for controlling a sodium-sulfur battery that, in an interconnected system in which the wind power generation device and an electric power storage-compensation device are combined to supply power to an electric power system, is included in the electric power storage-compensation device and compensates for output fluctuations of the wind power generation device. In this sodium-sulfur battery control method, a time of correcting or resetting a depth of discharge of the sodium-sulfur battery is determined within a predetermined period based on information about a wind speed, a wind direction, and the like, and the depth of discharge of the sodium-sulfur battery is corrected or reset in the determined time.

In this specification, correcting or resetting the management value of the depth of discharge denotes eliminating the discrepancy between the management value and the actual depth of discharge. Though an expression such as correction or resetting of the management value of the depth of discharge is used in this specification, a simpler expression such as correction or resetting is synonymous with the above-mentioned expression. Moreover, if the depth of discharge can be accurately managed, then a stored energy can be known, too. Accordingly, the depth of discharge can be translated to the stored energy in this specification.

In the sodium-sulfur battery control method according to the present invention, the time of correcting of resetting the depth of discharge of the sodium-sulfur battery is determined within the predetermined period based on weather information, and the depth of discharge of the sodium-sulfur battery is corrected or reset in the determined time. In this way, the discrepancy between the actual depth of discharge and the management value for the sodium-sulfur battery can be eliminated while suppressing any influence on the output of the interconnected system. Since the depth of discharge is corrected or reset periodically, the depth of discharge of the sodium-sulfur battery included in the electric power storage-compensation device can be managed accurately. This prevents the problem that the sodium-sulfur battery suddenly reaches the charge end and becomes unable to continue charge or suddenly reaches the discharge end and becomes unable to continue discharge, and as a result cannot compensate for output fluctuations of the renewable energy power generation device.

For example, suppose the power generation device that fluctuates in output is a wind power generation device. When any of (for example) a time during which a strong wind continues, a time during which a no-wind condition continues, and a time during which there is a wind of a stable wind speed is predicted to occur within (for example) one week based on information about a wind speed, a wind direction, and the like and, if necessary, seasonal information, the time is determined as a time of correcting or resetting the depth of discharge of the sodium-sulfur battery. When the time during which a strong wind continues is predicted, the sodium-sulfur battery needs to be charged in that time. Accordingly, by setting, prior to the time, the output target value of the interconnected system higher than the normal output target value or setting the charge/discharge target value of the sodium-sulfur battery higher than the normal charge/discharge target value toward the time, the sodium-sulfur battery is led to the discharge end. Upon detecting the discharge end, the management value of the depth of discharge is corrected or reset. When the time during which a no-wind condition continues is predicted, the sodium-sulfur battery needs to be discharged in that time. Accordingly, by setting, prior to the time, the output target value of the interconnected system lower than the normal output target value or setting the charge/discharge target value of the sodium-sulfur battery lower than the normal charge/discharge target value toward the time, the sodium-sulfur battery is led to the charge end. Upon detecting the charge end, the management value of the depth of discharge is corrected or reset. When the time during which there is a wind of a stable wind speed is predicted, the management value of the depth of discharge can be corrected or reset upon detection of any of the charge end and the discharge end. By selecting the time of correcting or resetting the management value of the depth of discharge in such a manner, any influence on the output of the interconnected system can be suppressed even when the sodium-sulfur battery reaches any of the charge end and the discharge end in the time and cannot compensate for output fluctuations of the wind power generation device.

In the sodium-sulfur battery control method according to the present invention, it is ensured that the management value of the depth of discharge is corrected or reset within the predetermined period. Therefore, output fluctuations of the renewable energy power generation device can be continuously compensated over a long period of time by the electric power storage-compensation device that uses the sodium-sulfur battery controlled by the sodium-sulfur battery control method according to the present invention. This contributes to significantly improved reliability of the interconnected system in prolonged operation.

In the sodium-sulfur battery control method according to the present invention, there is no need to divide into a plurality of sodium-sulfur batteries (control systems) or provide an auxiliary system, in order to correct or reset the management value of the depth of discharge of the sodium-sulfur battery. Hence, the electric power storage-compensation device can be established at a lower cost, and the small-scale interconnected system that is superior in terms of cost can be realized.

The sodium-sulfur battery control method according to the present invention can be utilized as a method for controlling, in an interconnected system in which a power generation device that uses renewable energy such as wind power, solar photovoltaic energy, geothermal energy, or the like and fluctuates in output and an electric power storage-compensation device are combined to supply power to an electric power system, a sodium-sulfur battery included in the electric power storage-compensation device.

MODE FOR CARRYING OUT THE INVENTION

The following describes an embodiment of the present invention, with reference to drawings according to need. It is to be understood that the present invention is not limited to the embodiment, and various changes, modifications, improvements, and replacements may be made on the basis of knowledge of a person skilled in the art without departing from the scope of the present invention. For example, though the drawings represent a preferred embodiment of the present invention, the present invention is not limited to the mode and information shown in the drawings. In order to implement or verify the present invention, means identical or equivalent to those described in this specification may be applied, and means described below are preferred means.

Figure 1:
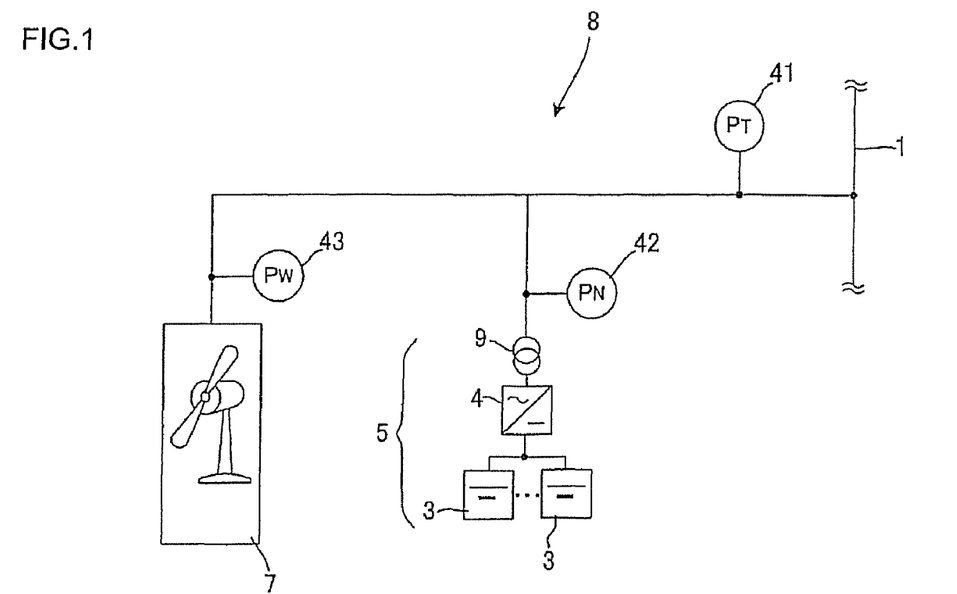
FIG. 1 is a system configuration diagram showing an example of an interconnected system including a power generation device that fluctuates in output and an electric power storage-compensation device.

An interconnected system is described first. A system configuration diagram shown in FIG. 1 represents an example of an interconnected system including a power generation device that fluctuates in output and an electric power storage-compensation device. An interconnected system 8 shown in FIG. 1 includes a wind power generation device 7 (renewable energy power generation device) that turns a power generator by converting wind power into windmill rotation, and an electric power storage-compensation device 5. The electric power storage-compensation device 5 includes a sodium-sulfur battery 3 which is a secondary battery capable of storing and outputting power, a bidirectional converter 4 having a dc/ac conversion function, and a transformer 9. For example, the bidirectional converter 4 may be composed of a chopper and an inverter, or composed of an inverter. The interconnected system 8 has one system of the wind power generation device 7 and one system of the sodium-sulfur battery 3 (the electric power storage-compensation device 5).

A typical interconnected system includes a private power generator as a power generation device and a sodium-sulfur battery heater and other auxiliary machines as a load, but they are omitted in the interconnected system 8. In the sodium-sulfur battery control method according to the present invention, they can be regarded as being included (added or subtracted) in power generated by the power generation device (the wind power generation device 7) that fluctuates in output.

In the interconnected system 8, the sodium-sulfur battery 3 is discharged in the electric power storage-compensation device 5, and power $P_N$ measured by a power meter 42 compensates for output fluctuations of power (power $P_W$ measured by a power meter 43) generated by the wind power generation device 7. In detail, by controlling the discharge (i.e., power $P_N$) of the sodium-sulfur battery 3 so that power (power $P_T$ measured by a power meter 41) output from the interconnected system 8 as a whole satisfies "$P_T = P_W + P_N =$constant" ($P_N = P_T - P_W$), stable power of high quality is output as power $P_T$ from the whole interconnected system 8, and supplied, for example, to an electric power system 1 between a distributing substation and a consumer of electricity.

Moreover, in the interconnected system 8, the sodium-sulfur battery 3 is charged in the electric power storage-compensation device 5, in accordance with output fluctuations of power $P_W$ generated by the wind power generation device 7. In detail, by controlling the charge (i.e., power $-P_N$) of the sodium-sulfur battery 3 so that power $P_N$ measured by the power meter 42 is "$P_N = -P_W$", fluctuating power $P_W$ is consumed, as a result of which power $P_T$ output from the whole interconnected system 8 can be brought to 0.

In either of the case of charging the sodium-sulfur battery 3 and the case of discharging the sodium-sulfur battery 3, the sodium-sulfur battery 3 is charged or discharged by changing a control target value of the bidirectional converter 4 in the electric power storage-compensation device 5 based on the output (power $P_W$) of the wind power generation device 7 so that power for compensating for the output is input or output, thereby absorbing output fluctuations of the wind power generation device 7.

The method for controlling the sodium-sulfur battery 3 is described below, with reference to FIGS. 2 to 4. The following describes the method for controlling the sodium-sulfur battery 3 in the case where, in the interconnected system 8 shown in FIG. 1, the sodium-sulfur battery 3 is charged and discharged while maintaining constant power $P_T$ traded with the electric power system and, when a time during which there is a wind of a stable wind speed (period C in FIG. 2) is predicted to occur within one week based on information such as a wind speed and a wind direction, a depth of discharge of the sodium-sulfur battery 3 is corrected or reset in that time.

Figure 2:
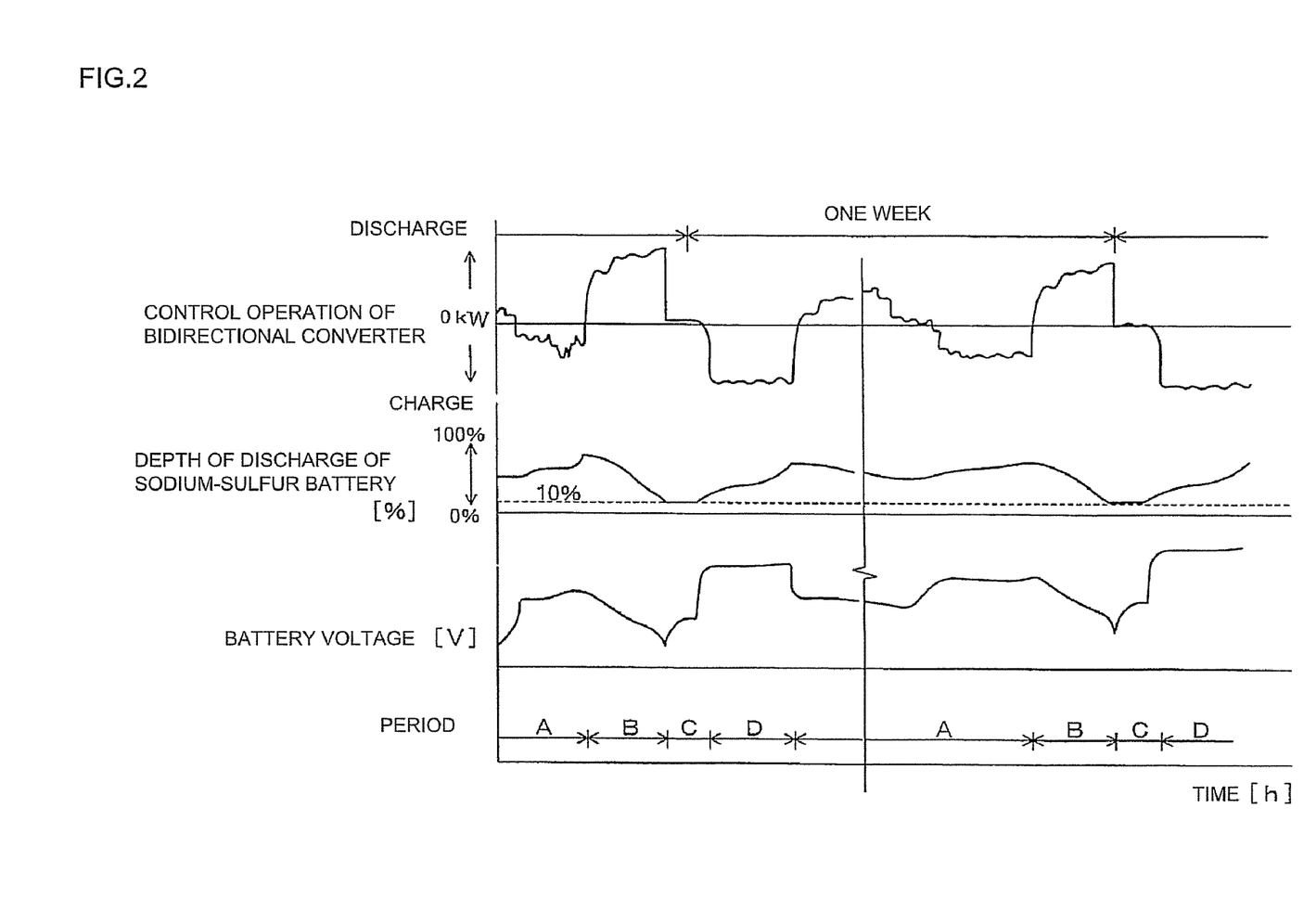
FIG. 2 is a graph explaining a sodium-sulfur battery control method according to the present invention, and showing an operation schedule of a sodium-sulfur battery.

FIG. 2 is a graph explaining the method for controlling the sodium-sulfur battery 3, and shows an operation schedule of the sodium-sulfur battery 3. A horizontal axis in FIG. 2 is a time axis, where periods A, B, C, and D are shown. A vertical axis in FIG. 2 shows a battery voltage and the depth of discharge of the sodium-sulfur battery 3 and a control operation (in a charge direction or a discharge direction) of the bidirectional converter 4. In other words, FIG. 2 is a graph showing the battery voltage, the depth of discharge, and the control operation of the bidirectional converter 4 in the same time axis. FIGS. 3 and 4 are each a graph showing an example of an output of the wind power generation device 7 and an output target value of the interconnected system 8 composed of the wind power generation device 7 and the electric power storage-compensation device 5 (the sodium-sulfur battery 3). FIG. 3 is a graph in period A, whereas FIG. 4 is a graph in period B.

Figure 3:
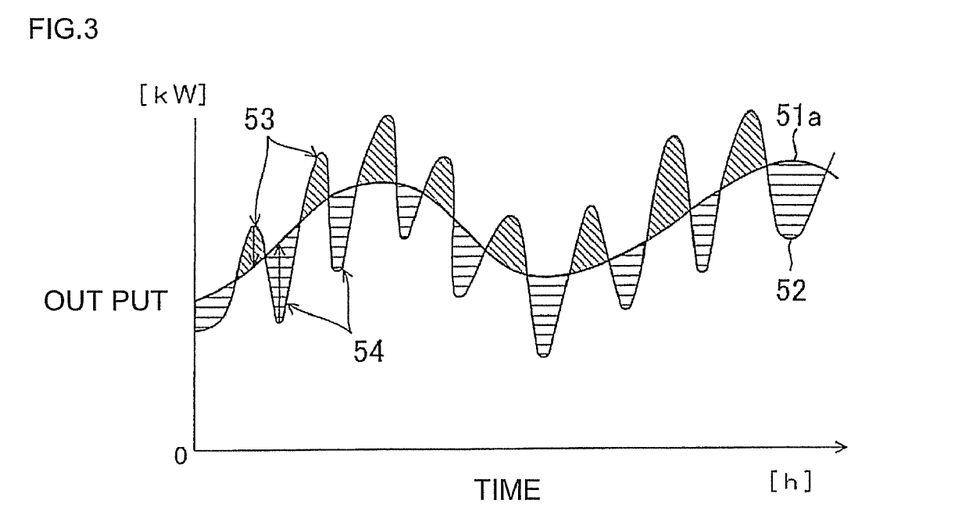
FIG. 3 is a graph showing an example of an output of a wind power generation device and an output target value of the interconnected system.
Figure 4:
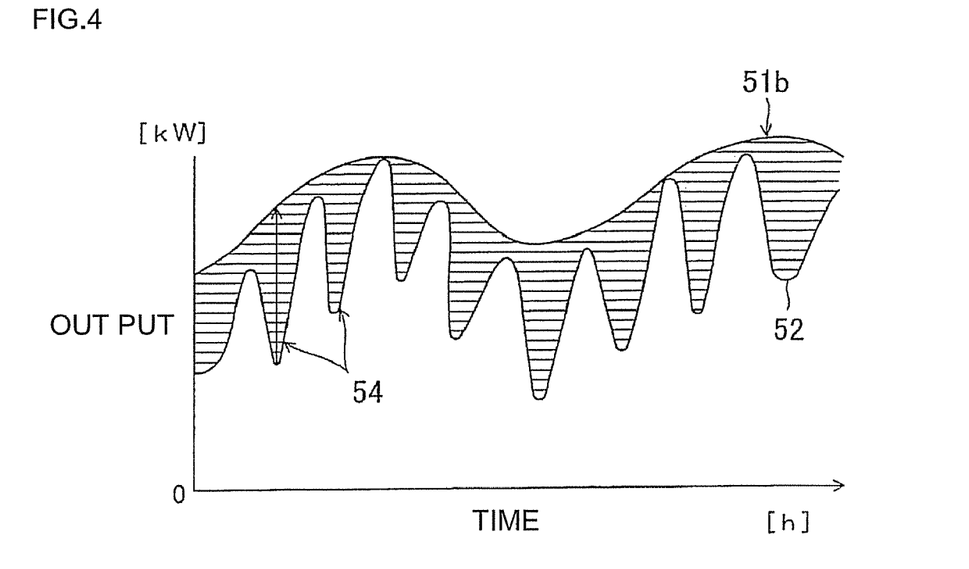
FIG. 4 is a graph showing an example of an output of the wind power generation device and an output target value of the interconnected system, in the case where the output target value of the interconnected system is higher than in FIG. 3.

FIGS. 3 and 4 each show an output curve 52 of the wind power generation device 7, and respectively show output target value curves 51a and 51b of the interconnected system 8 composed of the wind power generation device 7 and the electric power storage-compensation device 5 (the sodium-sulfur battery 3) in the same time as the output curve 52. To clarify a difference between the output target value curves 51a and 51b, the same output curve 52 is shown in FIGS. 3 and 4, and the output target value curve 51b in FIG. 4 is, as an example, a result of parallel translation of the output target value curve 51a in FIG. 3 (so as to be higher (larger) in output).

The sodium-sulfur battery 3 is charged when the output of the wind power generation device 7 is higher than the output target value of the interconnected system 8, and discharged when the output of the wind power generation device 7 is lower than the output target value of the interconnected system 8. This charge and discharge operation of the sodium-sulfur battery serves to compensate for output fluctuations of the wind power generation device 7.

In detail, in FIGS. 3 and 4, a difference (a charge-side difference 53 or a discharge-side difference 54 in the drawings) between the output target value curve 51a or 51b of the interconnected system 8 and the output curve 52 of the wind power generation device 7 is power charged to or discharged from the sodium-sulfur battery 3. Setting this power as the control target value (kW) of the bidirectional converter 4, the sodium-sulfur battery 3 is repeatedly charged/discharged. As a result of a change in control target value of the bidirectional converter 4 (namely, a change in output target value of the interconnected system 8), the output of the interconnected system 8 when the sodium-sulfur battery 3 operates according to the control target value of the bidirectional converter 4 gradually varies as shown by the output target value curve 51a or 51b of the interconnected system 8. However, large output fluctuations of the wind power generation device 7 are absorbed, so that a power generation device of a smoother, more stable output can be achieved.

In period A, the sodium-sulfur battery 3 is controlled so as to perform a normal charge and discharge operation, according to the output target value curve 51a of the interconnected system 8. That is, the sodium-sulfur battery 3 performs charge and discharge while maintaining its depth of discharge at about a center level (e.g., 50%±20%), to continuously compensate for output fluctuations of the wind power generation device 7 so that the output of the interconnected system 8 can be kept constant.

When a time (period C) during which there is a wind of a stable wind speed is predicted to occur within one week based on information about a wind speed, a wind direction, and the like and seasonal information, the output target value of the interconnected system 8 is increased toward period C so that a discharge end occurs in that time (period C). This is an operation of the sodium-sulfur battery 3 in period B. In detail, in period B, the output target value is changed from the output target value curve 51a to the output target value curve 51b. In other words, the output target value curve 51b is a curve based on the output target value that is calculated to cause the sodium-sulfur battery 3 to reach the discharge end at the beginning of period C. As a result of changing the output target value to the output target value curve 51b, only the discharge-side difference 54 is the difference between the output target value curve 51b of the interconnected system 8 and the output curve 52 of the wind power generation device 7, as shown in FIG. 4. Thus, the sodium-sulfur battery 3 is led to the discharge end.

When the discharge end is detected in period C, then the management value of the depth of discharge of the sodium-sulfur battery 3 can be corrected or reset. Subsequently, the sodium-sulfur battery 3 is charged in period D. After a certain amount of charge is completed, the sodium-sulfur battery 3 returns to the normal charge and discharge operation (period A).

INDUSTRIAL APPLICABILITY

The present invention is suitable as a sodium-sulfur battery control method that is preferably used in a small-scale interconnected system.

DESCRIPTION OF REFERENCE NUMERALS

1: electric power system
3: sodium-sulfur battery
4: bidirectional converter
5: electric power storage-compensation device
7: wind power generation device
8: interconnected system
9: transformer
41, 42, 43: power meter
51a, 51b: output target value curve of interconnected system
52: output curve of wind power generation device
53: charge-side difference (difference between output target value (curve) of interconnected system and output (curve) of wind power generation device, on side where sodium-sulfur battery is charged)
54: discharge-side difference (difference between output target value (curve) of interconnected system and output (curve) of wind power generation device, on side where sodium-sulfur battery is discharged)

The invention claimed is:

1. A method for controlling a sodium-sulfur battery that, in an interconnected system in which a power generation device that fluctuates in output and an electric power storage-compensation device are combined to supply power to an electric power system, is included in the electric power storage-compensation device and compensates for output fluctuations of the power generation device, the method comprising
    determining, based on weather information, a time of correcting or resetting a depth of discharge of the sodium-sulfur battery within a predetermined period, and correcting or resetting the depth of discharge of the sodium-sulfur battery in the determined time.

2. The method for controlling a sodium-sulfur battery according to claim 1, wherein the predetermined period is within one month.

3. The method for controlling a sodium-sulfur battery according to claim 1, wherein, toward the time of correcting or resetting the depth of discharge of the sodium-sulfur battery, an output target value of the interconnected system is set to be higher than an output target value set for power compensation or a charge/discharge target value of the sodium-sulfur battery is set to be higher than a charge/discharge target value set for power compensation to thereby lead the sodium-sulfur battery to a discharge end, and a management value of the depth of discharge is corrected or reset when the discharge end is detected.

4. The method for controlling a sodium-sulfur battery according to claim 1, wherein, toward the time of correcting or resetting the depth of discharge of the sodium-sulfur battery, an output target value of the interconnected system is set to be lower than an output target value set for power compensation or a charge/discharge target value of the sodium-sulfur battery is set to be lower than a charge/discharge target value set for power compensation to thereby lead the sodium-sulfur battery to a charge end, and a management value of the depth of discharge is corrected or reset when the charge end is detected.

5. The method for controlling a sodium-sulfur battery according to claim 1, wherein the power generation device that fluctuates in output is a renewable energy power generation device that uses renewable energy of at least one of wind power, solar photovoltaic energy, and geothermal energy.

6. The method for controlling a sodium-sulfur battery according to claim 2, wherein, toward the time of correcting or resetting the depth of discharge of the sodium-sulfur battery, an output target value of the interconnected system is set to be higher than an output target value set for power compensation or a charge/discharge target value of the sodium-sulfur battery is set to be higher than a charge/discharge target value set for power compensation to thereby lead the sodium-sulfur battery to a discharge end, and a management value of the depth of discharge is corrected or reset when the discharge end is detected.

7. The method for controlling a sodium-sulfur battery according to claim 2, wherein, toward the time of correcting or resetting the depth of discharge of the sodium-sulfur battery, an output target value of the interconnected system is set to be lower than an output target value set for power compensation or a charge/discharge target value of the sodium-sulfur battery is set to be lower than a charge/discharge target value set for power compensation to thereby lead the sodium-sulfur battery to a charge end, and a management value of the depth of discharge is corrected or reset when the charge end is detected.

8. The method for controlling a sodium-sulfur battery according to claim 2, wherein the power generation device that fluctuates in output is a renewable energy power generation device that uses renewable energy of at least one of wind power, solar photovoltaic energy, and geothermal energy.

9. The method for controlling a sodium-sulfur battery according to claim 3, wherein the power generation device that fluctuates in output is a renewable energy power generation device that uses renewable energy of at least one of wind power, solar photovoltaic energy, and geothermal energy.

10. The method for controlling a sodium-sulfur battery according to claim 4, wherein the power generation device that fluctuates in output is a renewable energy power generation device that uses renewable energy of at least one of wind power, solar photovoltaic energy, and geothermal energy.

* * * * *

UNITED STATES PATENT AND TRADEMARK OFFICE
CERTIFICATE OF CORRECTION

PATENT NO. : 8,163,407 B2  
APPLICATION NO. : 13/071884  
DATED : April 24, 2012  
INVENTOR(S) : Naoki Hirai

Page 1 of 1

It is certified that error appears in the above-identified patent and that said Letters Patent is hereby corrected as shown below:

Title Page

*please add:* Item (63), Related U.S. Application Data, Continuation of PCT/JP2009/066608, filed Sep. 25, 2009

Signed and Sealed this
Third Day of July, 2012

David J. Kappos
*Director of the United States Patent and Trademark Office*